Figure 1:
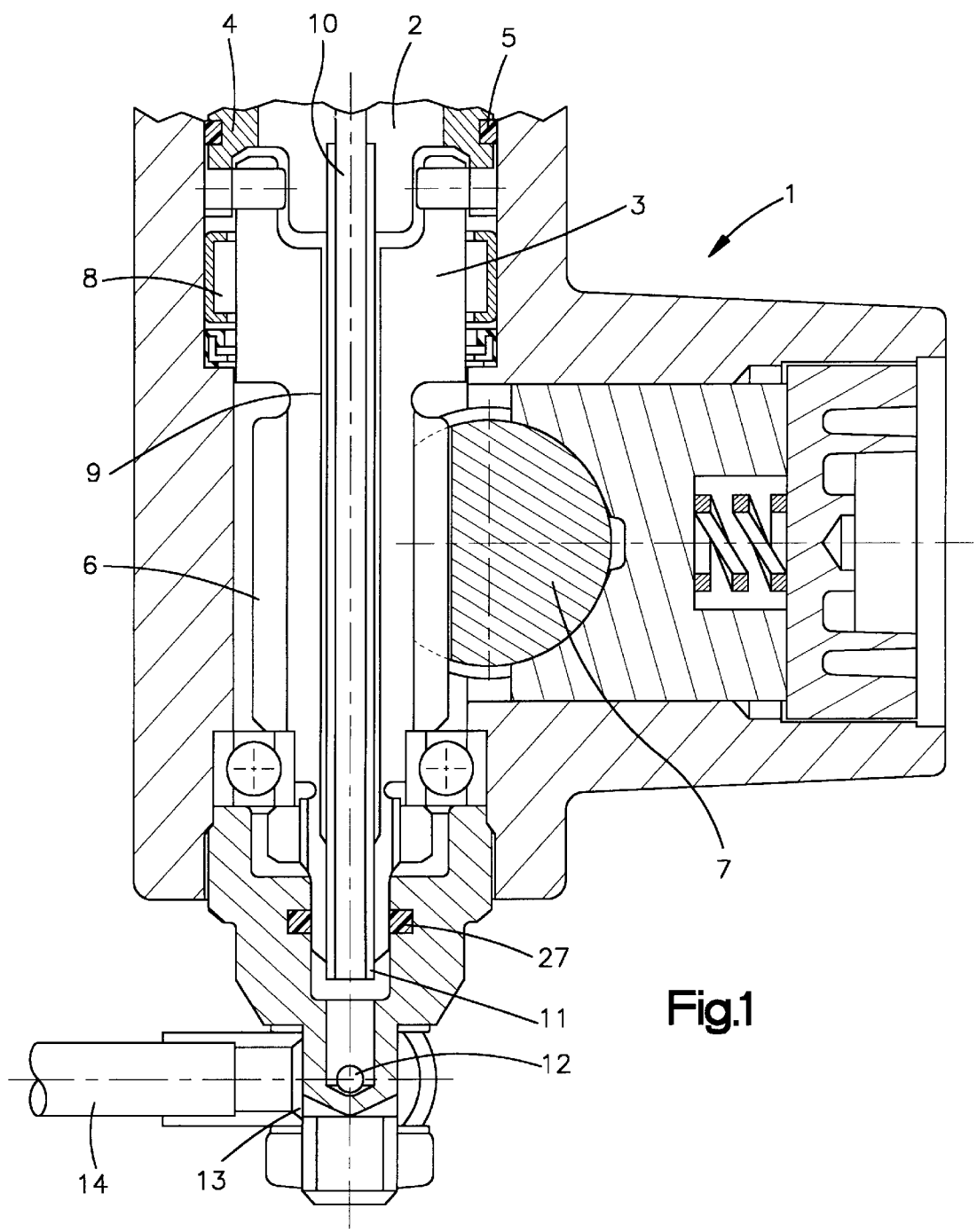

United States Patent [19]
Spillner et al.

[11] Patent Number: 6,016,837
[45] Date of Patent: Jan. 25, 2000

[54] STEERING VALVE WITH CLOSED CENTER

[75] Inventors: Robert Spillner, Düsseldorf; David Vile, Schwalmtal-Amern, both of Germany; Geoffrey Pritchard, Wrington, United Kingdom

[73] Assignee: TRW Fahrwerksysteme GmbH & Co. KG, Dusseldorf, Germany

[21] Appl. No.: 08/875,549

[22] PCT Filed: Dec. 9, 1995

[86] PCT No.: PCT/EP95/04854

§ 371 Date: Nov. 6, 1997

§ 102(e) Date: Nov. 6, 1997

[87] PCT Pub. No.: WO97/21579

PCT Pub. Date: Jun. 19, 1997

[51] Int. Cl.[7] .................................................. F15B 9/10
[52] U.S. Cl. .................... 137/625.24; 91/375 A; 137/625.23
[58] Field of Search ..................... 91/375 A; 137/625.23, 137/625.24

[56] References Cited

U.S. PATENT DOCUMENTS 5,697,400 12/1997 Pfeifer ............................ 137/625.23 X

FOREIGN PATENT DOCUMENTS

| 0302267 | 2/1989 | European Pat. Off. . |
|---|---|---|
| 0667280 | 8/1995 | European Pat. Off. . |
| 2426201 | 12/1974 | Germany . |
| 3731258 | 4/1988 | Germany . |
| 4317818 | 7/1994 | Germany . |
| 4437168 | 2/1996 | Germany . |
| 997065 | 6/1965 | United Kingdom . |

*Primary Examiner*—Gerald A. Michalsky
*Attorney, Agent, or Firm*—Tarolli, Sundheim, Covell, Tummino & Szabo

[57] ABSTRACT

In order to reduce the number of components required and increase the service life by preventing friction resulting from large-diameter seals, a steering valve (1) is provided which has a closed center for supplying hydraulic pressure to an actuator and which comprises an input shaft (2), an output shaft (3), a torsionally resilient element (11) which is connected at one end to the input shaft (2) and at the other end to the output shaft (3), a control pressure switching arrangement (4), and an axial force conversion unit (19–23), wherein at least one hydraulic line (15) guides reaction pressure in the input shaft (2).

3 Claims, 2 Drawing Sheets

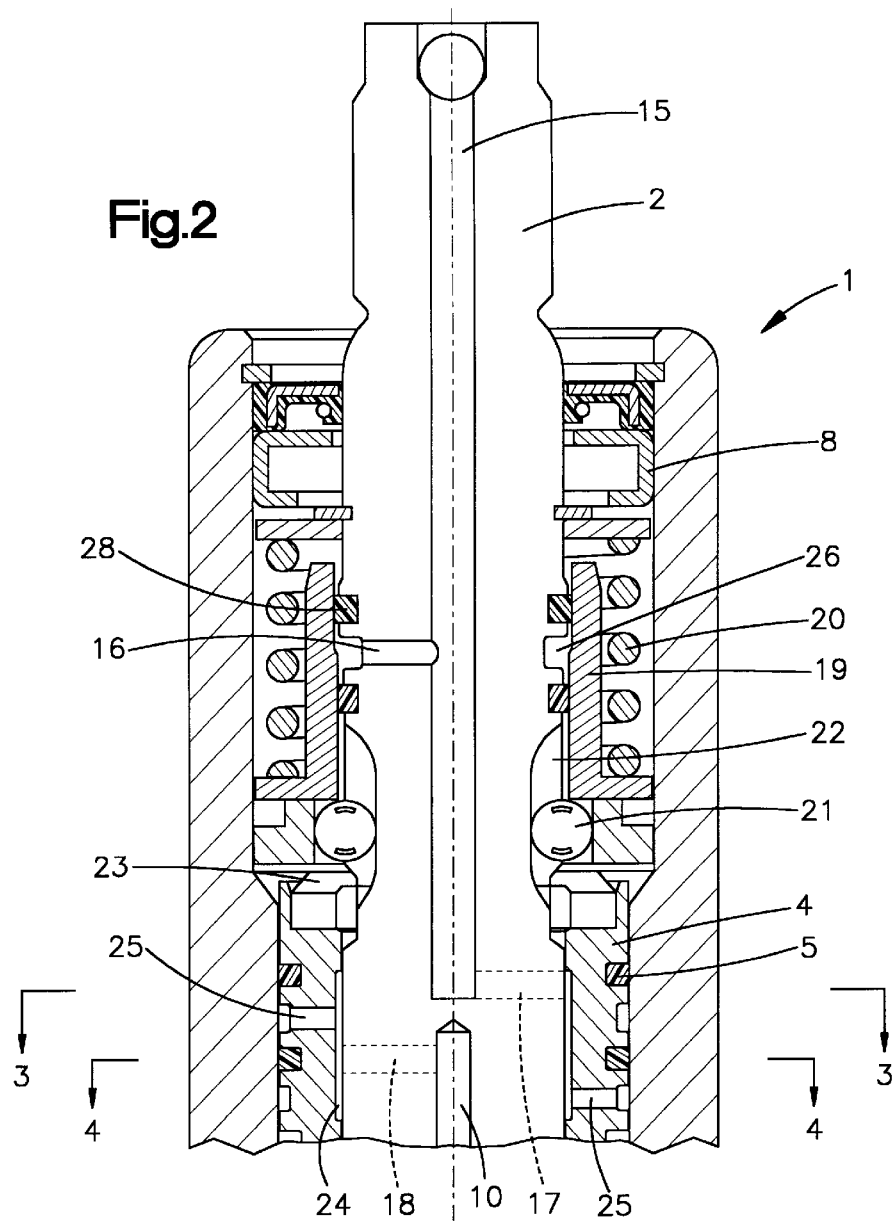
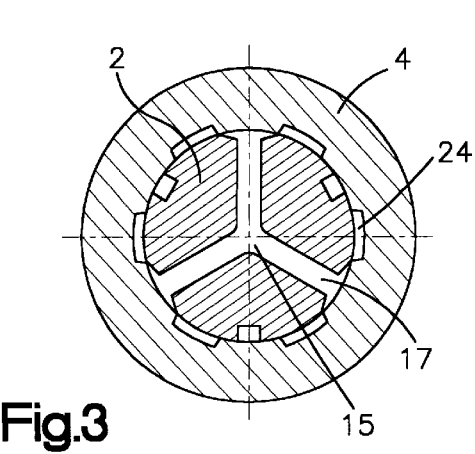
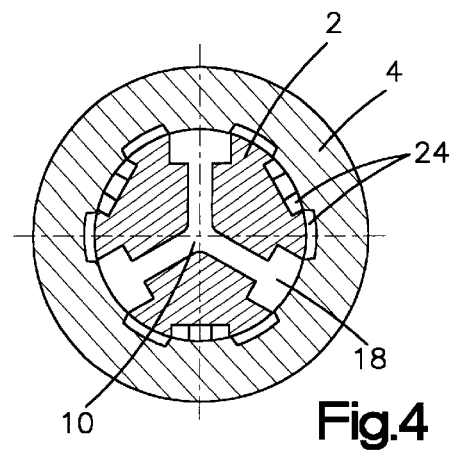

STEERING VALVE WITH CLOSED CENTER

The invention pertains to a steering valve with a closed center for supplying a control element with hydraulic pressure, consisting of an input shaft, an output shaft, a torsionally elastic element that is connected at one end to the input shaft and at the other to the output shaft, a control pressure switching device and a torque/axial force converter unit.

Steering valves of this class are utilized in particular in servo-steering systems. The structure of such servo-steering systems is conventional. An input shaft connected to a steering rod is connected to an output shaft equipped with a pinion. In a familiar manner, it is possible to insert a torsionally elastic element, a torsion rod, for instance, between the two shafts. The pinion acts on the toothed rack of a steering unit. The use of steering valves for such steering systems is familiar. For this purpose, a control pressure switching unit is provided, which may, for instance, be a valve casing engaged with the output shaft and surrounding the input shaft. Hydraulic fluid is pumped through the system with a pump. In case of a twisting of the input shaft relative the valve casing, hydraulic pressure is fed to a hydraulic motor, which assists the rack motion in one of the two possible directions.

A valve without torque/axial force converter unit is known from DE 37 31 258 A1, with a hydraulic-carrying line formed in the input shaft.

Steering valves employed in servo-steering systems are divided roughly into two groups. One type of steering valve employed in servo-steering systems is the steering valve with a so-called open center. In the neutral position of the steering valve with open center hydraulic fluid at low pressure is pumped through the open valve into a reservoir by a pump. A twisting of the input shaft relative to the valve casing causes an elevation in pressure, which is then fed to the servomotor. The disadvantage of steering valves with open center is that a steady hydraulic flow must be maintained even in the neutral position. Thus, wasted power must be produced by the drive motor, derived primarily from the pressure accumulation and the volume flow.

Such a steering valve, which has all the features of this class, apart from the open center, is disclosed in DE 43 17 818 C1. A reaction piston with an electrohydraulic converter EHW is employed as a torque/axial force converter unit.

Another type of steering valve used in servo-steering systems is the steering valve with a so-called closed center. The hydraulic flow to the two cylinder sides is interrupted in the neutral position of the valve by the closed center position. Thus, there is no hydraulic flow in the neutral position. An operating pressure, which, upon opening of the valve, only has to be held in prescribed limits by the pump then going into action, is applied to the practically closed valve and a reservoir. Because of the wasted power appearing for steering valves with open center even when the steering is not being operated, the steering valves with closed center are superior in the neutral position from the standpoint of power. They have the disadvantage, however, that practically no direct correlation exists between input torque and working pressure in the cylinder. In the prior art, therefore, additional measures were taken in order to provide the operator with a relationship between the steering force to be input and the resulting hydraulic pressure. Conventional seat valve arrangements are not without problems, since the seat valves undergo a certain wear and require considerable manufacturing and assembly effort. Moreover, they confront the operator with a threshold torque.

A fundamental problem in all embodiments of steering valves of the types mentioned above results from the arrangement of the hydraulic lines and the conduction of the hydraulic fluid. The steering valve, constructed in modular fashion, has essentially radial connection boreholes for hydraulic lines, accessible from the outside, in its housing. Accordingly, channels, grooves and the like, which direct the hydraulic fluid to control grooves, and the force-application surfaces of the pistons in the torque/axial force converter units and the like are formed on its interior wall. It is customary, for instance, to guide the hydraulic fluid in annular grooves, which are connected according to the rotational positions to the appropriate guide channels in order to direct hydraulic fluid to the required positions or to prevent it from flowing. In any case, this results in the necessity of using large-diameter seals, in order to separate the individual hydraulic fluid conduction regions from one another. This applies to control groove arrangements and in particular to the force-application surfaces of the pistons in the torque/axial force converter units, which must be blocked off against the surrounding spaces by large-diameter seals.

Beyond that, the number of hydraulic lines connected to the modular steering valve also determine the number of seals required. Any additional function that necessitates the connection of an additional hydraulic line thus simultaneously requires the use of at least one, and as a rule two, seals, which seal off the conduction channel from the surrounding spaces.

A servo-steering unit for passenger vehicles is known from DE 24 26 201 A1, wherein a hydraulic fluid conduction line for is formed in the torsion element for purposes of minimizing the size of the unit, but not with regard to wear and tear on the seals.

The large-diameter seals to be employed of necessity have large contact surfaces with the housing areas to be sealed off, which results in considerable friction. When using the servo-steering valve, this friction leads to wear, so that the service life of known steering valves is limited simply by the required seals. Since the seals must withstand considerable hydraulic pressures, the service lives are relatively short.

The exchange of a seal, however, requires a complete disassembly of the valve and a reassembly with subsequent adjustment, and is thus not economical.

Alongside the disadvantages connected with large-diameter seals, such as friction, unfavorable response behavior and reduced service life, conventional constructions of steering valves with closed center require the arrangement of a large number of components. In order to be able to exert a feedback hydraulic pressure on the torque/axial force converter unit, it is necessary to arrange, in the vicinity of the hydraulic lines to the control element, a shuttle valve that feeds back the respectively higher pressure via a hydraulic line to the reaction piston. Beyond that, there are frequently leakage losses in the vicinity of the shuttle valve, as well as switching noise and dead spots in the switching process.

Starting from this point, the present invention is based on the problem of refining a steering valve of this class, such that the number of large-diameter seals can be reduced and small-diameter seals can be employed, and such that the number of components can be reduced and an improved guidance of the torque/axial force converter unit is guaranteed.

As a technical solution of this problem, a valve of this class is provided in which at least one hydraulic line in the input shaft is constructed for hydraulic pressure feedback.

Due to the design according to the invention it is no longer necessary to provide a hydraulic connection for the feedback or reaction pressure in the housing area which seals off against the other area. Thus there exists the possibility of conducting the hydraulic pressure via the input shaft into an internal area, for instance between input shaft and torque/axial force converter unit, so that only areas of small diameter need be sealed off. Large-diameter seals are thus unnecessary, so that friction and seal wear are reduced, response behavior is improved, and service life increased. Switching noise and leakage, as occurs especially at shuttle valves, are also avoided.

Advantageously, it is proposed that the hydraulic line be constructed in the input shaft such that the area of the input shaft covered by the valve casing is connected to the area of the input shaft covered by the torque/axial force converter unit. The possibility is thus advantageously provided of conducting the reaction pressure inside the input shaft by guiding the latter directly via control edge connections to a reaction piston. Thus additional external connections are unnecessary, most importantly, the connection of a shuttle valve, which can be formed by the simple control edge arrangement. It is advantageously proposed for this purpose that the axial borehole in the vicinity of the valve casing and the reaction piston be led to the outside of the input shaft via radial boreholes. Thus it can be provided that the input shaft have an axial borehole in the vicinity of the longitudinal central axis, in which the torsion rod is inserted. The borehole can be formed such that an annular space that can be used as a hydraulic line remains between the interior wall of the borehole and the exterior of the torsion rod. In this case, a seal is necessary only in the lower area. There also exists the possibility of designing the torsion element to be hollow.

It is advantageously proposed that the torque/axial force converter unit be constructed as a reaction piston carried directly on the input shaft. It is particularly advantageous for the reaction piston to have an actuation surface turned toward the input shaft.

By arranging the radial boreholes in the vicinity of the hydraulic supply lines, there exists the possibility of constructing their outer opening areas as a control groove, so that the shuttle valve function can be implemented by control edge superimposition.

It is advantageously proposed that a second axial borehole be formed on the power steering valve according to the invention in the area of the output shaft. This second axial borehole advantageously serves for hydraulic pressure feedback.

With this design according to the invention, one achieves, first, a reduction in the number of large-diameter seals. This is the case because lines led in from the inside can now be more easily sealed off than can lines led in from the outside. The necessary seals can now be shifted to places which have a comparatively small diameter, so that the friction surfaces can be considerably reduced. The service life and the response behavior of a servo-valve are thereby increased.

The arrangement according to the invention makes possible above all the use of reaction piston devices with internally located actuation surfaces. Due to this measure, it is not necessary to have a large number of large-diameter seals, which, moreover, are under stronger stress since the reaction piston device is moved axially.

Additional advantages and characteristics of the invention are seen from the following description on the basis of the figures. These show in FIG. 1 a schematic, partially cut-away representation of an output shaft area of a power steering valve;

FIG. 2 a schematic, partially cut-away representation of an input shaft area of a power steering valve;

FIG. 3 a section through the input shaft and the valve casing along line 3—3 in FIG. 2; and FIG. 4 a section through the input shaft and the valve casing along line 4—4 in FIG. 2.

The power steering valve 1 shown in FIGS. 1 and 2 comprises an input shaft 2, which is connected at its free end to a steering linkage, not shown. The power steering valve 1 additionally comprises an output shaft 3 connected to a valve casing 4 which surrounds the input shaft 2. The valve casing 4 has hydraulic feed boreholes and control grooves, so that mutually separated areas are formed by means of seals 5. The seals 5 have a large diameter and large contact surfaces in the sealing area, so that corresponding frictions occur here.

The output shaft 3 has a pinion 6 which is connected to the rack 7 of a chassis not shown in greater detail. The shafts are inserted into the housing by means of bearings 8.

As the illustration in FIG. 1 shows, an axial borehole 9 is formed in the output shaft 3 and is continued in the lower closure area as a blind hole and connected to the exterior via a radial borehole 12. The area provided with the radial borehole 12 is inserted into a line joint having an annular line 13 and in turn connected to a hydraulic line 14. This figure also shows that an axial borehole 10 is formed in the input shaft 2. The input shaft 2 and the output shaft 3 are connected by a torsion tube 11 inserted into the axial boreholes 9,10 which takes over a number of special functions. First, the tube serves for carrying the axial borehole through from the lowest end of the output shaft 3 into the input shaft 2. The torsion tube additionally serves to provide a torsional stiffening against the twisting of the input shaft 2 with respect to the output shaft 3. As FIG. 1 shows, the axial borehole 9 is formed with a larger diameter into the lower area than in the lowest insertion area of the torsion tube 11. Thus the free length of the torsion tube is established. As the embodiment in FIG. 1 shows, easily sealed areas of small diameter were formed by arranging the axial borehole 10. In the illustrated embodiment, a seal 27 is arranged between the lowest closure area and the lowest end of the output shaft 3. Naturally, the torsion tube could have been extended and sealed off with respect to the blind hole above the radial borehole 12. The essential point is only that, instead of large-diameter seals 5, small-diameter seals 27 can be used, so that friction is reduced and service life increased due to reduced wear.

As shown in FIG. 2, the axial borehole 10 ends in the input shaft 2 as a blind hole. In the illustrated embodiment a second axial borehole 15, running from the other, free end until just before the axial borehole 10, is formed in the input shaft. This axial borehole is also formed as a blind hole. The axial borehole 10 is connected via the radial borehole 18 and the axial borehole 15 via the radial boreholes 16,17 to the exterior surface of the input shaft 2. As the cross sections in FIGS. 3 and 4 show, the radial boreholes are a number of boreholes in a star-shaped arrangement, which are shaped like control grooves in their opening areas.

In the upper area of the input shaft, inserted at its free end into the housing by means of a bearing 8 and hydraulically sealed off, a reaction piston 19 is arranged which is under an axial initial tension from a spring 20, i.e., a helical spring in the embodiment illustrated. In the lower area, balls 21 are arranged in axial grooves 22 formed in the input shaft and serve the axial guidance of an annular element which forms a spherical coupling together with a universal ball joint 23 arranged on the valve casing. The balls, not shown, which are guided in a ring, are pressed by the reaction piston 19 loaded by the spring 20 into recesses formed in the universal ball joint 23. If a torque is exerted on the input shaft 2, the balls are moved in the V-shaped recess in the universal ball joint 23, since the ball recess 23 is rigidly connected to the valve casing 4. Due to the recess-like shape, the balls are pushed by the torque out of the universal ball joint and press the reaction piston 19 upwards against the spring force. A centering and/or force relation can be achieved by this measure. The middle centering is favorable for any type of power steering valve. The reaction may also interact with a folded metal bellows or the like as the spring element.

In the illustrated embodiment, a hydraulic feedback pressure that loads the reaction piston in the same direction as the spring 20 is directed through the axial borehole 15 via the control grooves 24 through the radial borehole 17 and the radial borehole 18 onto the inner actuation surfaces 26 of the reaction piston 19. An axial force is thereby again exerted onto the balls which thus generate a torque opposed to that of the operator.

Via the hydraulic line 14, which is arranged on an annular line element 13, hydraulic pressure is directed into the radial borehole 12 [and] into the axial borehole 9 in the output shaft or the torsion tube 11 inserted into it. The supplied hydraulic pressure is directed via the torsion tube 11 into the axial borehole 10 in the input shaft. According to FIGS. 2 and 4, the hydraulic pressure is then conducted via radial boreholes 18 into the superposition area between input shaft 2 and valve casing 4. As can be seen in particular from FIG. 4, the superposition can be such that the supplied hydraulic pressure can reach its full level without fear of leakage losses. This means that no cutoff valves need be arranged in the hydraulic supply line. A particular advantage is also the reduction of the wetted interior surface of the control sleeve, so that static pressure brings about only slight deformations of the sleeve. This means that fits with less play are possible, whereby the overall efficiency of the steering system is increased. By a twisting of the input shaft 2 relative to the valve casing 4, the control-groove-shaped openings of the radial boreholes 18 superimpose the control grooves 24, so that the hydraulic pressure is conducted to the respective side of a hydraulic motor, not shown. Simultaneously, the pressure is conducted onwards via the control grooves 24 into the level of the section A—A which is shown in FIG. 3.

The description thus far shows that merely by arranging the axial boreholes 9,10 it is possible to dispense with a hydraulic feedback line that is led in the vicinity of the valve casing 4 through the housing and the valve casing 4. Thus it is possible to dispense with at least one large-diameter seal 5. It is replaced by the seal 27 in the area of small diameter at the lower end of the output shaft 3. Thus the valve casing can be formed correspondingly shortened, so that the power steering valve 1 can be shortened overall.

As described, the hydraulic pressure is conducted via the control grooves 24 into the level of the radial boreholes 17 which, likewise shaped like control groves in the opening area, conduct the hydraulic pressure on to the axial borehole 15. The axial borehole 15, closed at the free end of the input shaft 2, conducts the pressure as reaction pressure into the level of the radial borehole 16, which conducts the pressure into an annular line and onto the side of the actuation surfaces 26 of the reaction piston 19. Whereas the conduction of the reaction pressure was customarily done through the housing wall onto the back side of the reaction piston, large-diameter annular seals between reaction piston and housing wall were also necessary. These annular seals have likewise become completely superfluous, since the reaction piston area is completely sealed off by the small-diameter seals 28. The use of shuttle valves was also necessary, which can now be omitted. Above all, the valve knocking was completely avoided, as were leakage in the switching process and dead spots when switching the shuttle valve. Moreover, the control of the reaction piston is improved by its being seated on the input shaft.

A number of large-diameter seals can be avoided by the construction according to the invention. Depending on whether one or more axial boreholes are used, advantages result from the reduction of friction and thus the lengthening of service lives, the simplification of components, the improvement of functions, particularly response behavior, and, depending on how the boreholes are arranged, the shortening of the steering valve overall. Thus the arrangement of the axial borehole 9 in the torsion element leads to a shortening of the valve casing. The arrangement of a torsion tube 11, which is primarily inserted in the vicinity of the output shaft, leads to a shortening of the input shaft area, which in the prior art was primarily formed as a support of the torsion rod. Due to the required spring characteristics, a minimum length of the torsion element was prescribed. This can now likewise be shortened.

The described embodiment serves to explain the invention and is not limited by the described formation of two axial boreholes not directly connected.

LIST OF REFERENCE SYMBOLS

1 Power steering valve
2 Input shaft
3 Output shaft
4 Valve casing
5 Seal
6 Pinion
7 Rack
8 Bearing
9 Axial borehole
10 Axial borehole
11 Torsion tube
12 Radial borehole
13 Annular line
14 Hydraulic line
15 Axial borehole
16 Radial borehole
17 Radial borehole
18 Radial borehole
19 Reaction piston
20 Spring
21 Ball
22 Axial groove
23 Universal ball joint
24 Control grooves
25 Hydraulic borehole
26 Actual surface
27 Seal
28 Seal

We claim:
1. A steering valve for supplying hydraulic pressure to a final control element, said steering valve, comprising:
an input shaft having an axis about which said input shaft is rotatable, said input shaft including axially spaced first and second boreholes centered on said axis and a plurality of radial passages in fluid communication with said first and second boreholes;
an output shaft having a third axial borehole fluidly connected to a radial borehole, said third axial borehole extending coaxially with said first and second axial boreholes and being axially spaced from said first and second axial boreholes, said radial borehole being fluidly connected to a hydraulic line;

a torsionally elastic tubular element interconnecting said input shaft and said output shaft, said tubular element having a first end disposed in said second axial borehole in said input shaft and a second end disposed in said third axial borehole in said output shaft, said tubular element fluidly connecting said second and third boreholes;

a valve casing encircling a first portion of said input shaft, said valve casing including a plurality of axial control grooves for cooperating with said plurality of radial passages in said input shaft to fluidly connect said first and second axial boreholes; and an axial force converter unit surrounding a second portion of said input shaft for providing a centering force acting on said input shaft;

said first axial borehole extending from said first portion of said input shaft through said second portion of said input shaft and fluidly communicating with said axial force converter unit.

2. The steering valve of claim 1 wherein said axial force converter unit comprises a reaction piston guided axially on said input shaft.

3. The steering valve of claim 2 wherein said reaction piston has an internal actuation surface.

* * * * *